(12) United States Patent
Parimi et al.

(10) Patent No.: US 8,697,015 B2
(45) Date of Patent: Apr. 15, 2014

(54) FLOW DISTRIBUTION FOR MONOLITHIC REACTORS

(75) Inventors: Krishniah Parimi, Alamo, CA (US); Steven Xuqi Song, Albany, CA (US); Moinuddin Ahmed, Hercules, CA (US); Thien Duyen Thi Nguyen, Castro Valley, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 77 days.

(21) Appl. No.: 13/308,674

(22) Filed: Dec. 1, 2011

(65) Prior Publication Data

US 2013/0142700 A1    Jun. 6, 2013

(51) Int. Cl.
- *B01J 8/02* (2006.01)
- *B01J 19/26* (2006.01)
- *B01J 4/00* (2006.01)

(52) U.S. Cl.
USPC ........... 422/606; 422/607; 422/632; 422/633; 422/220; 422/222; 422/224

(58) Field of Classification Search
USPC .......................... 422/606, 607, 632, 633, 220
See application file for complete search history.

(56) References Cited

U.S. PATENT DOCUMENTS

| | | | |
|---|---|---|---|
| 4,126,539 A * | 11/1978 | Derr et al. ............... | 208/108 |
| 4,140,625 A | 2/1979 | Jensen | |
| 4,615,796 A * | 10/1986 | Kramer ..................... | 208/146 |
| 5,633,066 A | 5/1997 | Lipp et al. | |
| 6,312,586 B1 | 11/2001 | Kalnes et al. | |
| 6,623,707 B1 | 9/2003 | Addiego et al. | |
| 6,632,414 B2 | 10/2003 | Liu | |
| 6,673,237 B2 | 1/2004 | Liu et al. | |
| 6,716,339 B2 | 4/2004 | Liu et al. | |
| 6,773,580 B2 | 8/2004 | Boger et al. | |
| 6,800,773 B2 | 10/2004 | Reesink et al. | |
| 6,822,128 B2 | 11/2004 | Letourneur et al. | |
| 6,824,749 B2 | 11/2004 | Leloup et al. | |
| 7,032,894 B2 | 4/2006 | Adusei et al. | |
| 7,182,922 B2 * | 2/2007 | Boyer et al. ................. | 422/606 |
| 7,182,924 B2 | 2/2007 | Brundage et al. | |
| 7,304,013 B2 | 12/2007 | Addiego et al. | |
| 7,771,156 B2 | 8/2010 | Deangelis et al. | |
| 2006/0078483 A1 | 4/2006 | Kemoun et al. | |
| 2006/0163758 A1 * | 7/2006 | Muller ..................... | 261/114.1 |
| 2007/0241467 A1 | 10/2007 | Sevenhuijsen et al. | |
| 2009/0162266 A1 | 6/2009 | Kemoun | |
| 2011/0081282 A1 | 4/2011 | Parimi et al. | |

OTHER PUBLICATIONS

PCT International Search Report and Written Opinion, International Application No. PCT/US2012/065178, dated Mar. 26, 2013.

* cited by examiner

*Primary Examiner* — Jennifer A Leung
(74) *Attorney, Agent, or Firm* — E. Joseph Gess; Michael D. Ross

(57) ABSTRACT

Systems, apparatus, and methods for distributing a mixed phase fluid to a monolith catalyst bed within a reactor, wherein a mixed phase fluid may be generated by a nozzle tray comprising a plurality of nozzles, the mixed phase fluid may be distributed by the nozzles to a mixed phase distributor system, and the mixed phase fluid may be further distributed by the mixed phase distributor system to a plurality of monolith channels within the reactor.

26 Claims, 11 Drawing Sheets

FLOW DISTRIBUTION FOR MONOLITHIC REACTORS

TECHNICAL FIELD

This invention relates to flow distribution for monolithic reactors.

BACKGROUND

Conventional reactors containing packed beds of particulate solids are used in the chemical, petroleum refining, and other industries for a variety of different processes. Examples of such processes include: catalytic dewaxing, hydrotreating, hydrodesulphurization, hydrofinishing, and hydrocracking. In these processes a mixture comprising a liquid phase and a gas phase are typically passed over each packed bed within a downflow reactor.

Monolithic reactors may also be used for various catalytic processes. Each monolith contains a multitude of parallel channels through which fluid reactants flow, wherein each channel contains or is coated with catalyst. Monolithic reactors provide a uniform and well defined flow path for reactants, resulting in low pressure drop, high flow rates and productivity, and increased catalyst life. Other advantages of monolithic reactors for refinery hydroprocessing include high geometric surface area, low internal diffusion, excellent gas-liquid-solid mass transport, high selectivity, high reaction rates, and ease of reactor scale-up.

In the event of non-uniform distribution at the inlet to a packed bed reactor, some correction can occur due to radial diffusion during gas and liquid flow through the packed bed. In contrast, monolithic reactors do not allow radial diffusion; therefore, it is of critical importance to provide uniform flow distribution to the inlet of the monolith.

U.S. Pat. No. 7,032,894 to Adusei, et al. discloses a device for distributing fluid into a monolith bed, the device including a plurality of flow channels stacked in order of decreasing diameter. The flow channels successively split a flow stream into multiple flow streams prior to the flow stream entering the monolith bed.

There is a need for systems, apparatus, and methods for providing uniform fluid distribution to monolithic reactors for the efficient and safe operation thereof.

SUMMARY

According to an embodiment of the present invention there is provided a fluid distribution unit comprising a nozzle tray including a plurality of nozzles, and a mixed phase distributor system disposed beneath the nozzle tray, wherein each of the nozzles is configured for generating a mixed phase fluid, the nozzle tray is configured for distributing the mixed phase fluid to the mixed phase distributor system via the plurality of nozzles, and the mixed phase distributor system is configured for laterally dispersing the mixed phase fluid and for uniformly distributing the mixed phase fluid to a plurality of locations beneath the mixed phase distributor system.

In another embodiment, there is provided a reactor system comprising a reactor shell, and at least one catalytic unit disposed within the reactor shell, wherein each of the catalytic units comprises a fluid distribution unit and at least one monolith block disposed beneath the fluid distribution unit. The fluid distribution unit comprises a nozzle tray comprising a plurality of nozzles, and a mixed phase distributor system disposed beneath the nozzle tray; wherein each of the nozzles is configured for generating a mixed phase fluid, the nozzle tray is configured for distributing the mixed phase fluid to the mixed phase distributor system, and the mixed phase distributor system is configured for distributing the mixed phase fluid to each of a plurality of channels of the at least one monolith block.

In a further embodiment, there is provided a method for distributing a fluid mixture within a reactor, the method comprising contacting a liquid hydrocarbon feed with a gas within each of a plurality of fluid distribution nozzles; via the plurality of nozzles, forming a mixed phase fluid comprising the liquid hydrocarbon feed and the gas; via the plurality of nozzles, distributing the mixed phase fluid to a mixed phase distributor system; and via the mixed phase distributor system, distributing the mixed phase fluid to each of a plurality of channels of at least one monolith block.

In still a further embodiment, there is provided a fluid distribution nozzle comprising a nozzle body, at least one liquid inlet arranged laterally in the nozzle body, and an axial gas inlet at the proximal end of the nozzle. The nozzle body includes a proximal body portion and a distal body portion. The proximal body portion defines a substantially cylindrical proximal void within the nozzle body. The distal body portion defines a substantially cylindrical distal void within the nozzle body. The proximal void is in fluid communication with the distal void. The distal void is wider than the proximal void. The proximal void and the distal void jointly define an inner surface of the nozzle body. The proximal terminus of the proximal void defines the gas inlet, and each of the liquid inlets is in fluid communication with the inner surface of the nozzle body.

DETAILED DESCRIPTION

Embodiments of the present invention provide systems, apparatus, and methods for the even distribution of fluids for monolithic reactors. Such reactors may be used for a wide range of catalyzed processes, e.g., in the chemical and petroleum refining industries, including processes such as catalytic dewaxing, hydrotreating, hydrofinishing, and hydrocracking. Embodiments of the present invention may be useful for mixed-phase reactions between a liquid, such as a liquid hydrocarbon feed, and a gas, such as hydrogen gas. In an embodiment, the liquid and gas may be combined to form a mixed phase fluid, and the mixed phase fluid may be uniformly distributed to a plurality of channels of a monolith within a downflow reactor.

Unless otherwise specified, the recitation of a genus of elements, materials, or other components from which an individual or combination of components or structures can be selected is intended to include all possible sub-generic combinations of the listed components and mixtures thereof. Also, "include" and its variants are intended to be non-limiting, such that recitation of items in a list is not to the exclusion of other like items that may also be useful in the materials, elements, structures, compositions, and methods as disclosed herein.

Figure 1A:
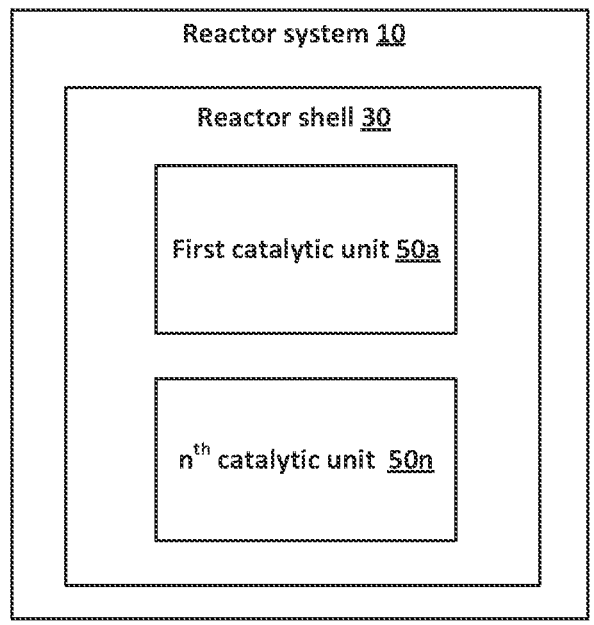
FIG. 1A is a block diagram schematically representing a reactor system, according to an embodiment of the present invention.

With reference to the drawings, FIG. 1A is a block diagram schematically representing a reactor system 10, according to an embodiment of the present invention. Reactor system 10 may comprise a reactor shell 30. Reactor shell 30 may house at least one catalytic unit 50 (see, for example, FIG. 1B). In an embodiment, reactor system 10 may comprise a plurality of catalytic units, as represented in FIG. 1A as a first catalytic unit 50a and an $n^{th}$ catalytic unit 50n. The number of catalytic units 50 within reactor shell 30 may typically be in the range from two (2) to about ten (10), i.e., n may be in the range from about two (2) to ten (10).

Figure 1B:
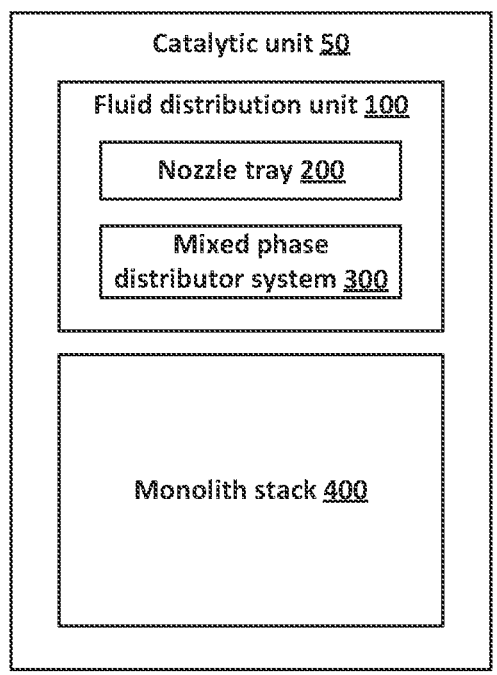
FIG. 1B is a block diagram schematically representing a catalytic unit for a reactor system, according to an embodiment of the present invention.

FIG. 1B is a block diagram schematically representing a catalytic unit 50 for a reactor system, according to an embodiment of the present invention. In an embodiment, each catalytic unit 50 may comprise a fluid distribution unit 100 and a monolith stack 400. Each fluid distribution unit 100 may comprise a nozzle tray 200 and a mixed phase distributor system 300 disposed beneath nozzle tray 200 (see, for example, FIG. 4). Each monolith stack 400 may comprise a plurality of monolith blocks 410 (see, for example, FIG. 7).

In an embodiment, fluid distribution unit 100 may further comprise at least one of a mixing box, a collection tray, and a deflector plate (not shown), for example, substantially as disclosed in commonly assigned U.S. patent application Ser. No. 12/839,227, filed Jul. 19, 2010, the disclosure of which is incorporated by reference herein in its entirety for all purposes.

Figure 2A:
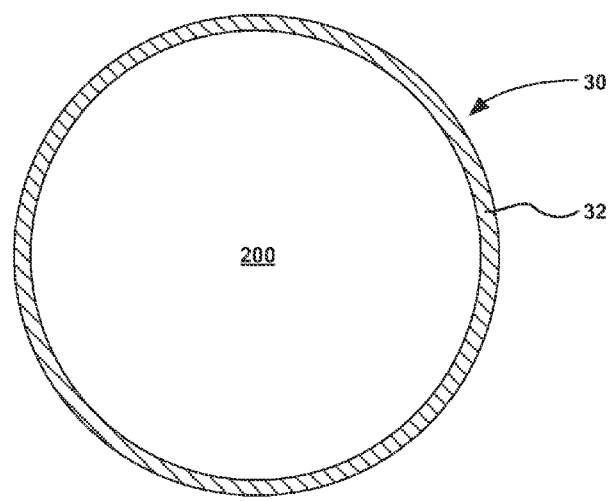
FIG. 2A is a schematic plan view of a nozzle tray in relation to a reactor shell, according to an embodiment of the present invention.

FIG. 2A is a schematic plan view of a nozzle tray in relation to a reactor shell, according to an embodiment of the present invention. With reference to FIGS. 2A-3B, nozzle tray 200 may comprise a substantially planar portion having planar portion upper and lower surfaces 202a, 202b, respectively; and nozzle tray 200 may have a plurality of voids therethrough, wherein each of the voids may be sealingly engaged by a distal portion of a fluid distribution nozzle 210/210' (see, for example, FIGS. 3A-3B).

Figure 2B:
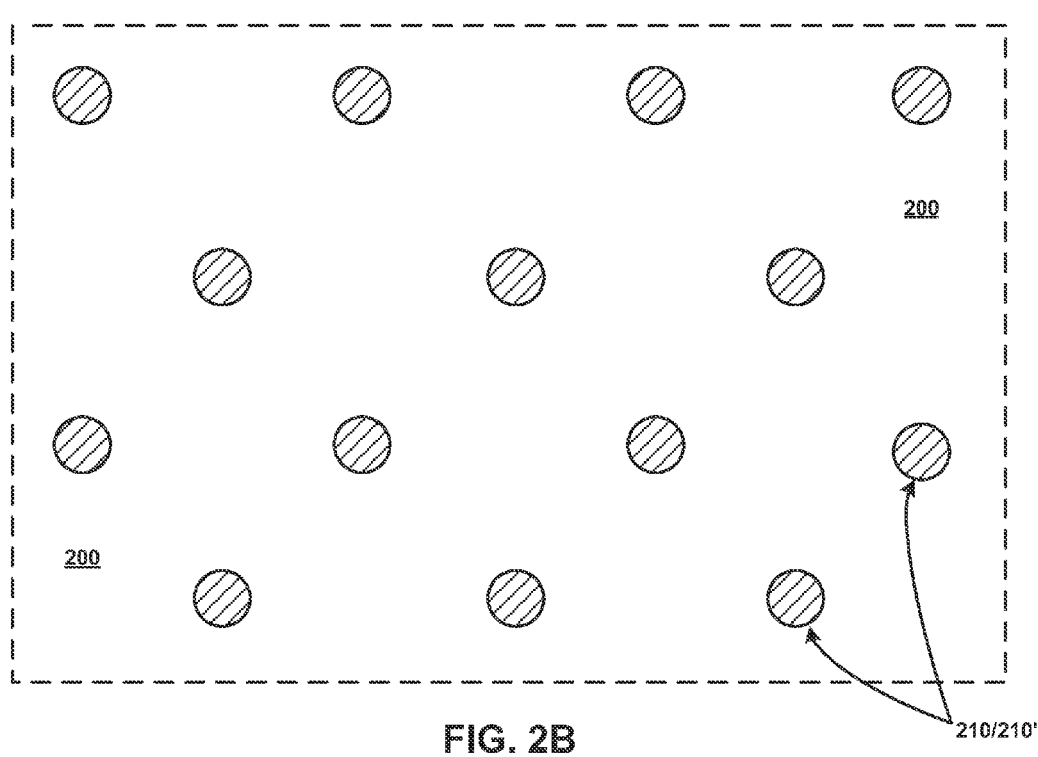
FIG. 2B is an enlarged schematic plan view of a portion of a nozzle tray including an array of fluid distribution nozzles, according to an embodiment of the present invention.

FIG. 2B is an enlarged schematic plan view of a portion of a nozzle tray 200, according to an embodiment of the present invention. Nozzle tray 200 may include a plurality of fluid distribution nozzles 210/210'. Each nozzle 210/210' may be disposed at least substantially vertically on or within nozzle tray 200 (see, for example, FIGS. 3A-3B). In an embodiment, the plurality of nozzles 210/210' may be arranged on nozzle tray 200 as a nozzle array having a triangular pitch with a nozzle spacing generally in the range from about three (3) to ten (10) inches, or from about 4 to 8 inches. Embodiments of the invention are not limited to any particular nozzle array configuration or nozzle spacing.

Each fluid distribution nozzle 210/210' may be configured for combining a liquid and a gas therein to form a mixed phase fluid, and for uniformly distributing the mixed phase fluid. In an embodiment, the mixed phase fluid may be distributed to a mixed phase distributor system 300 disposed beneath nozzle tray 200 (see, for example, FIG. 4). In an embodiment, the mixed phase fluid may be distributed from nozzle tray 200 to mixed phase distributor system 300 such that a substantially equal volume of the mixed phase fluid is dispensed from each nozzle 210/210'.

Figure 3A:
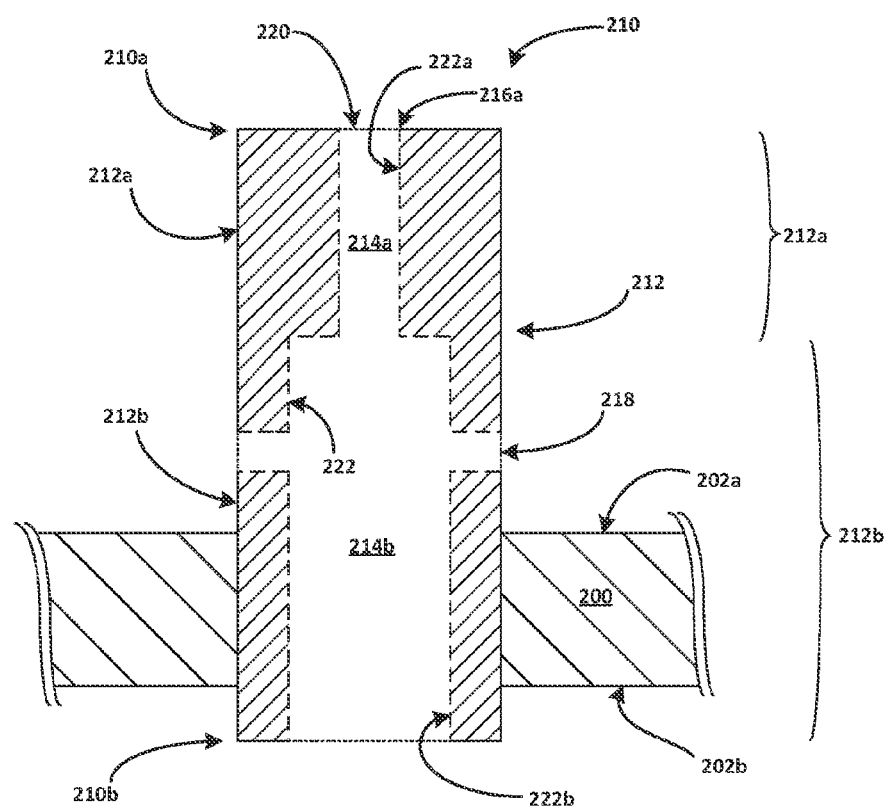
FIG. 3A is a schematic longitudinal sectional view of a fluid distribution nozzle in relation to a nozzle tray, according to an embodiment of the present invention.

FIG. 3A is a schematic longitudinal sectional view of a fluid distribution nozzle in relation to a nozzle tray 200, according to an embodiment of the present invention. Fluid distribution nozzle 210 may comprise a nozzle body 212, a nozzle proximal end 210a, a nozzle distal end 210b, at least one liquid inlet 218, and a gas inlet 220. In an embodiment, nozzle body 212 may be solid. As a non-limiting example, nozzle 210 may be formed by casting and/or machining.

Nozzle body 212 may comprise a proximal body portion 212a and a distal body portion 212b. Proximal body portion 212a defines a substantially cylindrical proximal void 214a. Distal body portion 212b defines a substantially cylindrical distal void 214b in fluid communication with proximal void 214a. Proximal void 214a may have a first diameter or width, and distal void 214b may have a second diameter or width. The second diameter or width may be substantially greater than the first diameter or width. In an embodiment, distal void 214b may be at least twice (2×) as wide as proximal void 214a.

In an embodiment, gas inlet 220 may be disposed axially at nozzle proximal end 210a, and gas inlet 220 may be defined by the proximal terminus 216a of proximal void 214a. Gas inlet 220 may be configured for the passage of gas therethrough into proximal void 214a. Each liquid inlet 218 may be disposed laterally on nozzle body 212. In an embodiment, liquid inlets 218 may be disposed in distal body portion 212b. Each liquid inlet 218 may be configured for the passage of liquid therethrough into distal void 214b. Proximal void 214a and distal void 214b jointly define an inner surface 222 of nozzle body 212. Inner surface 222 of nozzle body 212 may comprise a proximal inner surface 222a and a distal inner surface 222b. Proximal void 214a and distal void 214b define proximal inner surface 222a and distal inner surface 222b, respectively. Gas inlet 220 and each of liquid inlets 218 are in fluid communication with inner surfaces 222a and 222b of nozzle body 212.

In an embodiment, each liquid inlet 218 may be linear. In a sub-embodiment, each liquid inlet 218 may be disposed tangentially to distal inner surface 222b of distal body portion 212b. Liquid inlet configurations for fluid distribution nozzles are disclosed in commonly assigned U.S. patent application Ser. No. 12/839,222, filed Jul. 19, 2010, the disclosure of which is incorporated by reference herein in its entirety.

In an embodiment, each of liquid inlets 218 may be configured for forming a film of liquid on distal inner surface 222b of distal body portion 212b, and each of liquid inlets 218 may be configured for promoting the spiral flow of liquid on distal inner surface 222b of distal body portion 212b. The flow of liquid on distal inner surface 222b may be in a direction distal to liquid inlets 218. Each nozzle 210 may typically have from one (1) to about four (4) liquid inlets 218. Each nozzle 210 may be configured for generating a mixed phase fluid and for discharging the mixed phase fluid distally from nozzle distal end 210b. In an embodiment, nozzle 210 may be configured for promoting the distribution of fluid emanating from nozzle distal end 210b as an evenly dispersed spray, e.g., having a conical spray pattern.

Figure 3B:
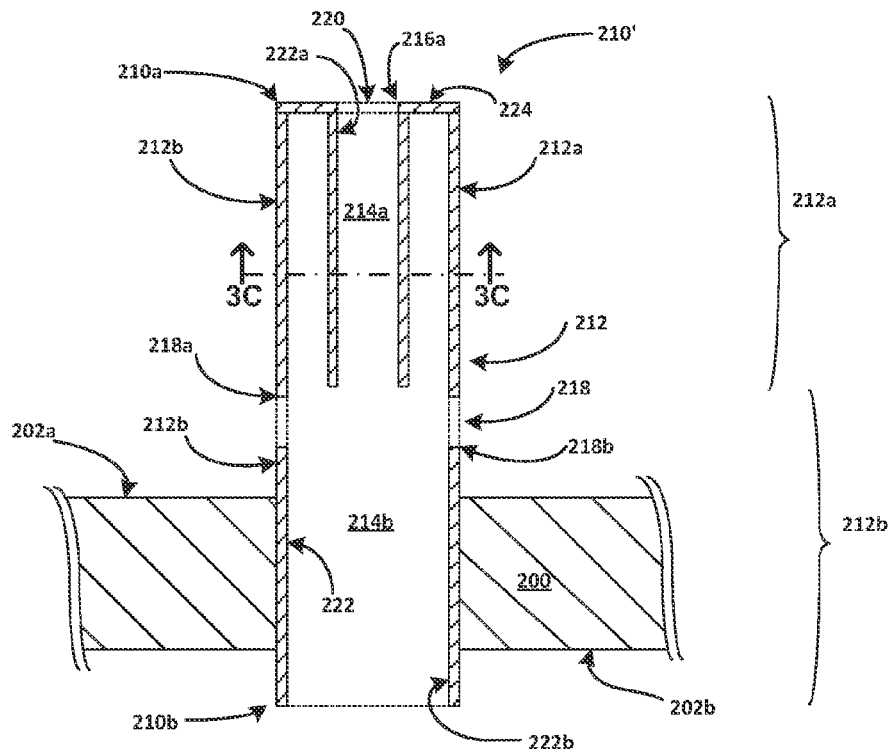
FIG. 3B is a schematic longitudinal sectional view of a fluid distribution nozzle in relation to a nozzle tray.

FIG. 3B is a schematic longitudinal sectional view of a fluid distribution nozzle 210' in relation to a nozzle tray 200, according to another embodiment of the present invention. Fluid distribution nozzle 210' may comprise a nozzle body 212, a nozzle proximal end 210a, a nozzle distal end 210b, at least one liquid inlet 218, a gas inlet 220, and an annular nozzle cap 224.

Nozzle body 212 may comprise a proximal body portion 212a and a distal body portion 212b. Proximal body portion 212a defines a substantially cylindrical proximal void 214a. Distal body portion 212b defines a substantially cylindrical distal void 214b in fluid communication with proximal void 214a. Proximal void 214a may have a first diameter or width, and distal void 214b may have a second diameter or width. The second diameter or width may be substantially greater than the first diameter or width. In an embodiment, distal void 214b may be at least twice (2×) as wide as proximal void 214a.

In an embodiment, gas inlet 220 may be disposed axially at nozzle proximal end 210a. Gas inlet 220 may be defined by the proximal terminus 216a of proximal void 214a. In an embodiment, gas inlet 220 may also be defined by an inner portion of nozzle cap 224. Gas inlet 220 may be configured for the passage of gas therethrough into proximal void 214a.

Each liquid inlet 218 may be disposed laterally in nozzle body 212. In an embodiment, at least the distal end 218b of each liquid inlet 218 may be disposed in distal body portion 212b. In an embodiment, the whole of each liquid inlet 218 may be disposed within distal body portion 212b. In another embodiment, the proximal end 218a of at least one liquid inlet 218 may extend proximally into proximal body portion 212a, such that the location of liquid inlet 218 may overlap the junction between proximal body portion 212a and distal body portion 212b.

Each liquid inlet 218 may be configured for the passage of liquid therethrough into distal void 214b. Proximal void 214a and distal void 214b jointly define an inner surface of nozzle body 212. Gas inlet 220 and each of liquid inlets 218 are in fluid communication with inner surfaces 222a and 222b of nozzle body 212. Nozzle 210' may have other features and characteristics, for example, as described herein for nozzle 210 with reference to FIG. 3A and/or as disclosed in commonly assigned U.S. patent application Ser. No. 12/839,222, filed Jul. 19, 2010, the disclosure of which is incorporated by reference herein.

Figure 3C:
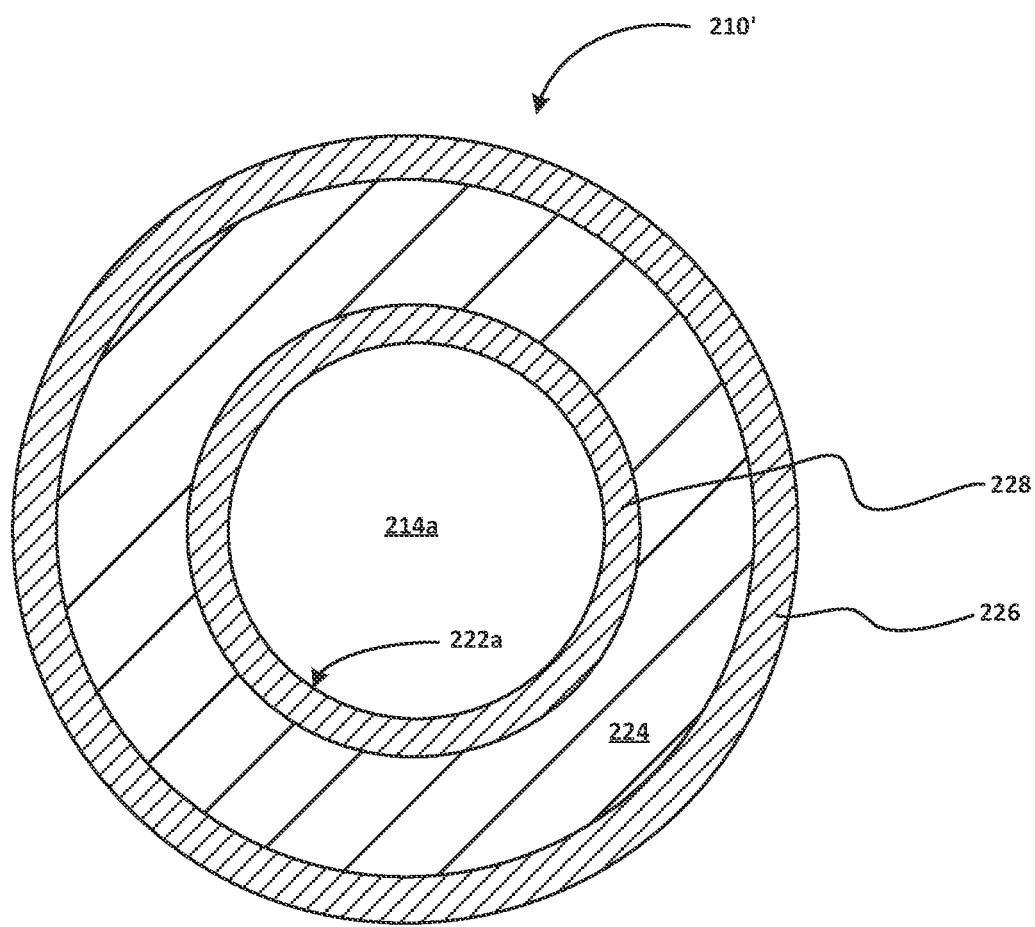
FIG. 3C is a sectional view of the nozzle of FIG. 3B as seen along the lines 3C-3C of FIG. 3B, according to another embodiment of the present invention.

FIG. 3C is a sectional view of nozzle 210' of FIG. 3B as seen along the lines 3C-3C of FIG. 3B. In an embodiment, proximal body portion 212 may comprise an outer cylinder 226, and an inner cylinder 228 disposed within outer cylinder 226. In an embodiment, inner cylinder 228 may be disposed coaxially with outer cylinder 226.

With further reference to FIGS. 3B-3C, distal body portion 212b may comprise outer cylinder 226. Inner cylinder 228 may terminate distally at a location defining the proximal end of distal void 214b. Nozzle cap 224 may be sealingly engaged with both the proximal end of outer cylinder 226 and the proximal end of inner cylinder 228. In an embodiment, nozzle cap 224 may be affixed, e.g., welded, to both outer cylinder 226 and inner cylinder 228. In an embodiment, nozzle body 212 may be formed from commercially available, off-the-shelf piping, e.g., comprising stainless steel tubes or cylinders. Embodiments of the invention are not limited to any particular fluid distribution nozzle configuration(s).

Figure 3D:
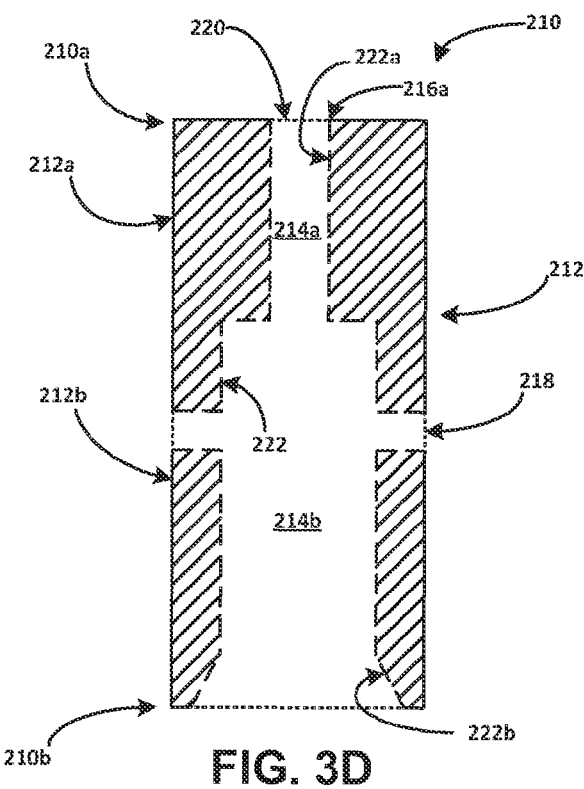
FIGS. 3D and 3E each show a longitudinal sectional view of a fluid distribution nozzle having a tapered distal void, according to embodiments of the present invention.
Figure 3E:
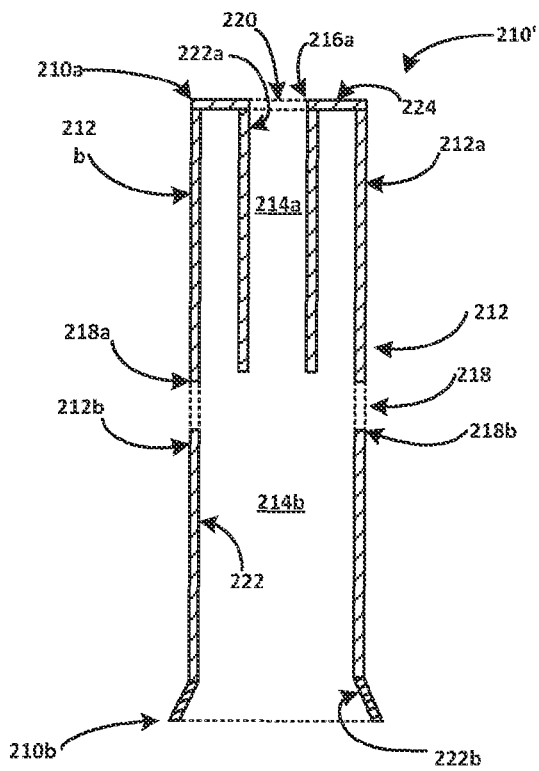

FIGS. 3D and 3E each show a longitudinal sectional view of a fluid distribution nozzle wherein distal void 214b may taper distally from narrow to broad, according to embodiments of the present invention. In the embodiment of FIG. 3D, the distal end of nozzle body 212 may be chamfered. In the embodiment of FIG. 3E, the distal end of nozzle body 212 may be flared. The embodiments of FIGS. 3D and 3E may have other elements and features as described, for example, with reference to the embodiments of FIGS. 3A and 3B, respectively.

Figure 3F:
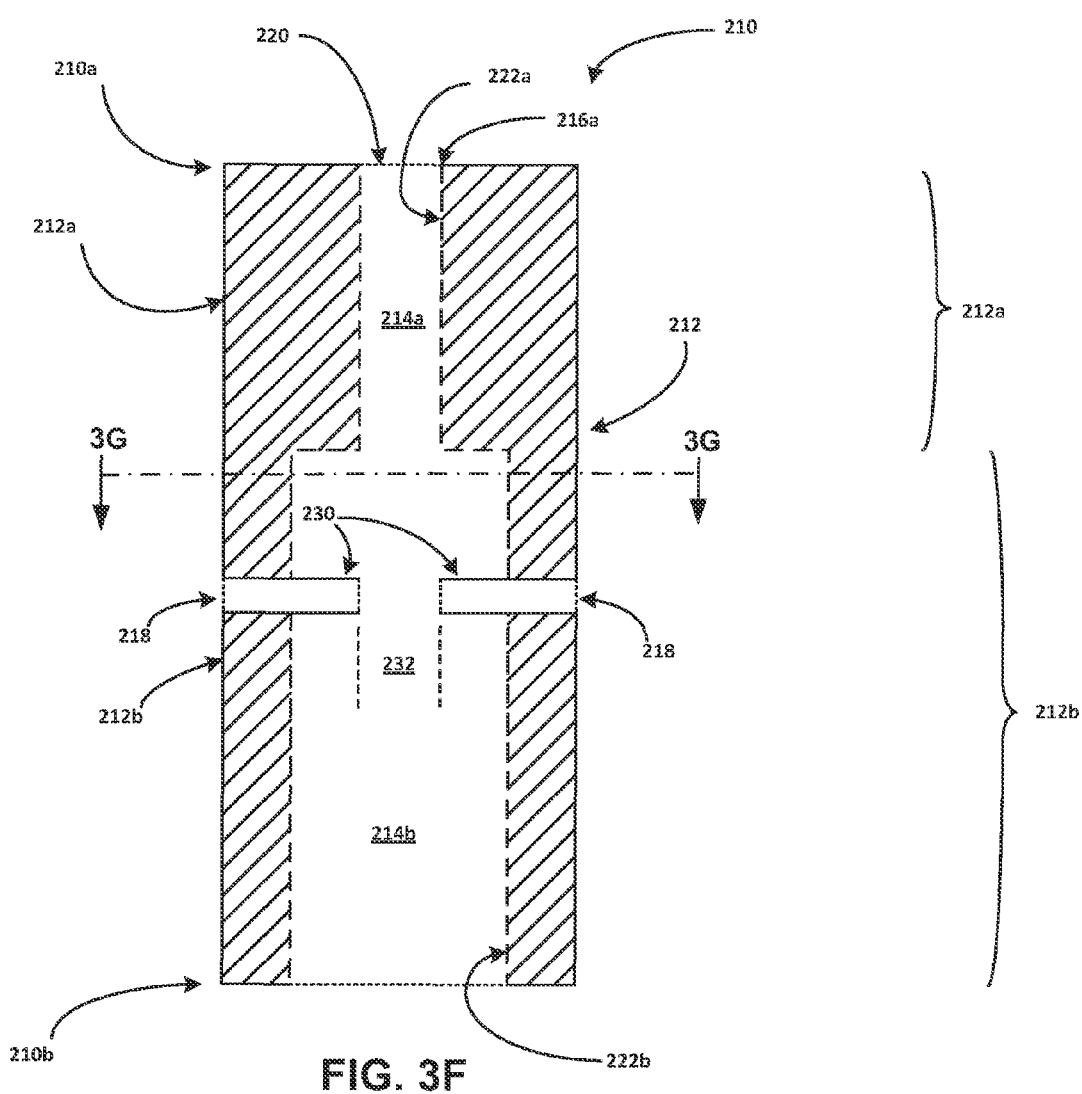
FIG. 3F is a schematic longitudinal sectional view of a fluid distribution nozzle.
Figure 3G:
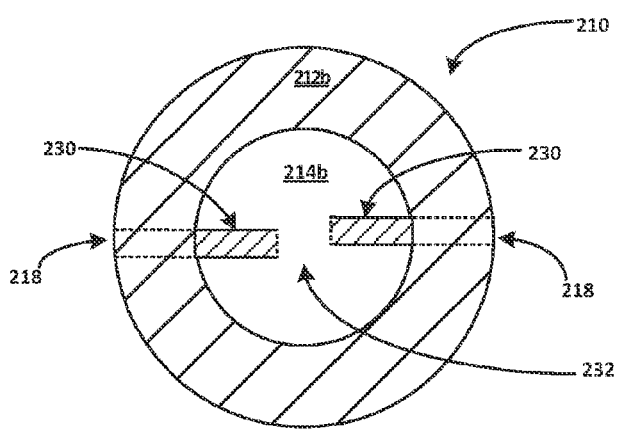
FIG. 3G is a sectional view of the nozzle of FIG. 3F as seen along the lines 3G-3G of FIG. 3F, according to another embodiment of the present invention.

FIG. 3F is a schematic longitudinal sectional view of a fluid distribution nozzle, and FIG. 3G is a sectional view of the nozzle of FIG. 3F as seen along the lines 3G-3G of FIG. 3F, according to another embodiment of the present invention. The embodiment of FIGS. 3F-G may have elements and features as described, for example, with reference to the embodiments of FIGS. 3A-E and 3J-L. The embodiment of FIGS. 3F-G may further comprise at least one extension conduit 230. In an embodiment, two or more extension conduits 230 may be radially offset.

In an embodiment, at least one extension conduit 230 may extend inward non-radially from nozzle body 212. In another embodiment, at least one extension conduit 230 may extend radially inward from nozzle body 212. In an embodiment, at least one extension conduit 230 may be linear or curved. Extension conduits 230 may be curved upwards or curved downwards (see, for example, FIGS. 3H-I).

As a non-limiting example, the number of extension conduits 230 per nozzle 210 may be in the range from 1 (one) to 4 (four). In an embodiment, each nozzle 210 may comprise a plurality (e.g., from 1 (one) to 4 (four)) of liquid inlets 218 and a corresponding plurality of extension conduits 230.

Although FIG. 3F shows extension conduits 230 as being substantially orthogonal to the nozzle axis, extension conduits 230 may be inclined, either upwards or downwards, at various angles. In an embodiment, each extension conduit 230 may comprise a substantially linear metal pipe.

Figure 3H:
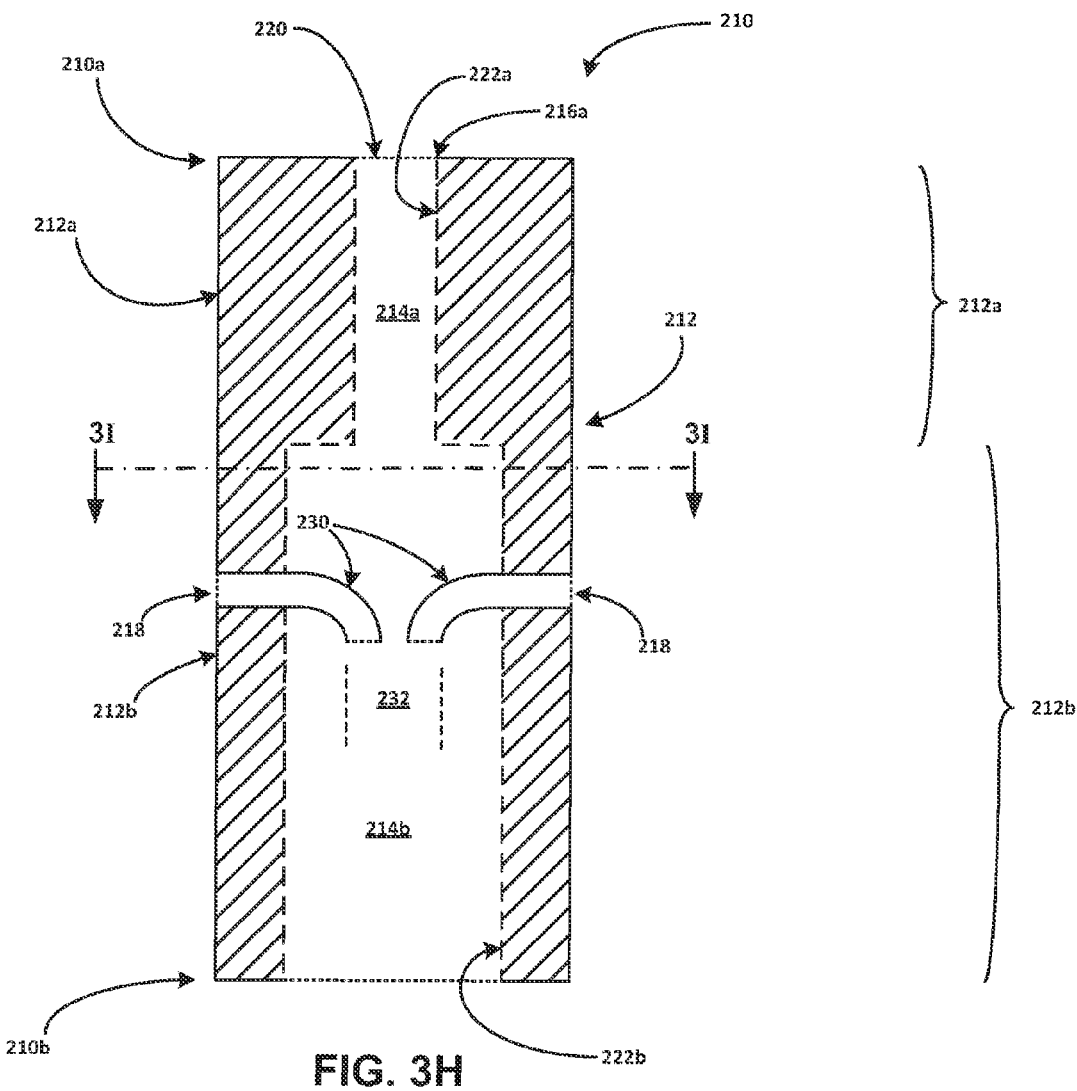
FIG. 3H is a schematic longitudinal sectional view of a fluid distribution nozzle.
Figure 3I:
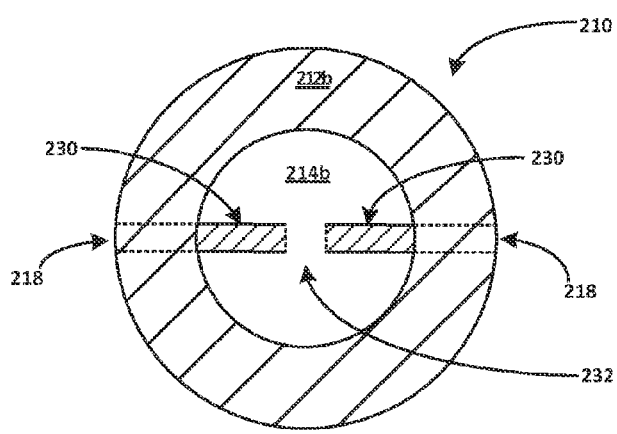
FIG. 3I is a sectional view of the nozzle of FIG. 3H as seen along the lines 3I-3I of FIG. 3H, according to another embodiment of the present invention.

FIG. 3H is a schematic longitudinal sectional view of a fluid distribution nozzle, and FIG. 3I is a sectional view of the nozzle of FIG. 3H as seen along the lines 3I-3I of FIG. 3H, according to another embodiment of the present invention. The embodiment of FIGS. 3H-I may have elements and features as described, for example, with reference to the embodiments of FIGS. 3A-E and 3J-L. The embodiment of FIGS. 3H-I may further comprise at least one curved extension conduit 230. In an embodiment, extension conduits 230 may be curved downwards (i.e., distally). The curved portion starts at about half-way between the wall and the center of the pipe to direct the liquid flow into the path of the gas flow.

It is preferable that the location of liquid conduit in the nozzle body (212) be within the distance of one diameter of the conduit 214a from the bottom edge of the gas conduit 214a.

In an embodiment, at least one pair of extension conduits 230 may be affixed at diametrically opposed locations on nozzle body 212. Other numbers and configurations for extension conduits 230 are also contemplated. In an embodiment, each extension conduit 230 may comprise a curved or bent metal pipe.

With further reference to FIGS. 3F-I, each extension conduit 230 may extend inwardly from nozzle body 212 into distal void 214b. Each extension conduit 230 may be in fluid communication with a corresponding liquid inlet 218 and with distal void 214b. In an embodiment, each nozzle 210 may comprise a plurality (e.g., from 1 (one) to 4 (four)) of extension conduits 230 and a corresponding plurality of liquid inlets 218. Each extension conduit 230 may be affixed to nozzle body 212 at the corresponding liquid inlet 218.

With still further reference to FIGS. 3F-I, extension conduit(s) 230 may be configured for delivering liquid from the corresponding liquid inlet(s) 218 to axial region 232 of distal void 214b. In an embodiment, a liquid hydrocarbon feed may be delivered to axial region 232 of distal void 214b via one or more extension conduit(s) 230, and the liquid hydrocarbon feed may be contacted by a gas stream flowing from proximal void 214a through axial region 232 of distal void 214b.

Figure 3J:
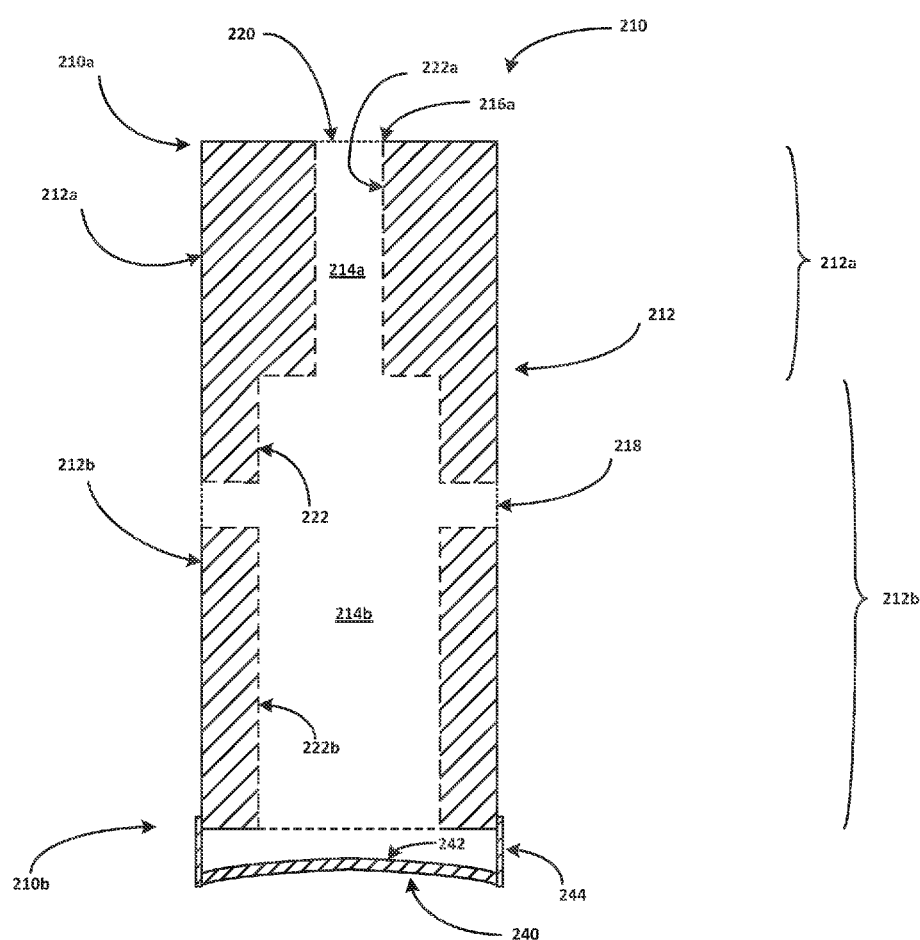
FIG. 3J is a schematic longitudinal sectional view of a fluid distribution nozzle including a splash guard.
Figure 3K:
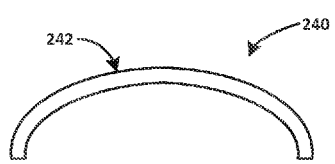
FIG. 3K is a side view of a splash guard having a domed configuration.
Figure 3L:
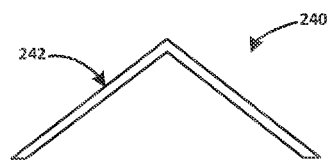
FIG. 3L is a side view of a splash guard having a conical configuration, according to another embodiment of the present invention.

FIG. 3J is a schematic longitudinal sectional view of a fluid distribution nozzle including a splash guard; FIG. 3K is a side view of a splash guard for a fluid distribution nozzle, the splash guard having a domed configuration; and FIG. 3L is a side view of a splash guard for a fluid distribution nozzle, the splash guard having a conical configuration. Nozzle 210 may be configured for generating a mixed phase fluid and for discharging the mixed phase fluid distally from nozzle distal end 210b.

The embodiment of FIG. 3J may have elements and features as described, for example, with reference to the embodiments of FIGS. 3A-I. The embodiment of FIG. 3J may further comprise a splash guard 240 disposed distally to nozzle distal end 210b. Splash guard 240 may be configured for contacting the mixed phase fluid emanating from nozzle distal end 210b. In an embodiment, splash guard 240 may be configured for protecting materials disposed beneath nozzle 210 from the impact of fluid emanating from nozzle distal end 210b.

Splash guard 240 may be supported from nozzle distal end 210b via one or more support members 244. In an embodiment, splash guard 240 may comprise a metal plate, e.g., comprising stainless steel. In an embodiment, each support member 244 may comprise a metal rod. In a sub-embodiment, support members 24 may be welded to the outside of nozzle distal end 210b. The number of support members 244 per splash guard 240 may generally be in the range from about 1 (one) to 4 (four), or from about 2 (two) to 3 (three).

In an embodiment, splash guard 240 may have a convex upper surface 242. Splash guard 240 may be disposed at least substantially orthogonally to the nozzle axis and at least substantially co-axially with nozzle body 212. With reference to FIGS. 3K and 3L, respectively, splash guard 240 may be configured as substantially domed or substantially conical.

Other configurations for splash guard 240 are also possible. In an embodiment, the diameter of splash guard 240 may be from about 50% to 150% of the diameter of nozzle 212.

Figure 4:
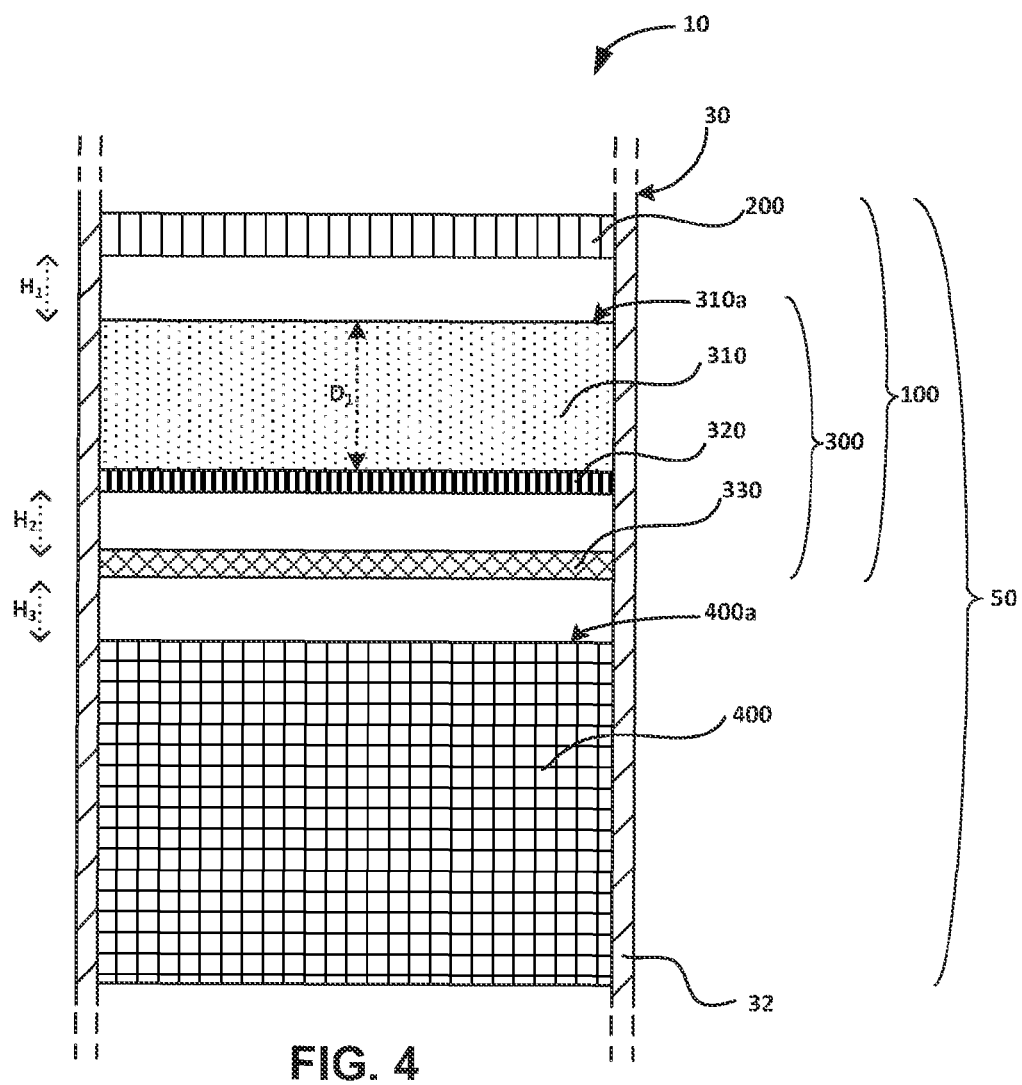
FIG. 4 is a schematic longitudinal sectional view of a portion of a reactor system showing a catalytic unit within a reactor shell, according to an embodiment of the present invention.

FIG. 4 is a schematic longitudinal sectional view of a catalytic unit for a reactor system, according to an embodiment of the present invention. Catalytic unit 50 may be disposed within reactor shell 30 of reactor system 10. In an embodiment, FIG. 4 may represent only a portion of reactor system 10. Reactor system 10 may include a plurality of catalytic units 50, wherein catalytic units 50 may be arranged or stacked vertically on top of each other within reactor shell 30. In an embodiment, reactor system 10 may comprise from about two (2) to 10 catalytic units 50. Reactor shell 30 may have substantially vertical reactor shell walls 32.

Each catalytic unit 50 may comprise a fluid distribution unit 100 and a monolith stack 400. Each fluid distribution unit 100 may comprise a nozzle tray 200 and a mixed phase distributor system 300 disposed beneath nozzle tray 200. Nozzle tray 200 may comprise a plurality of nozzles 210/210'. Nozzles 210/210' may be arranged on tray 200 as a nozzle array, for example, as described hereinabove with reference to FIG. 2B. Nozzle tray 200 may be configured for uniformly distributing the mixed phase fluid to mixed phase distributor system 300 via nozzles 210/210'.

In an embodiment, each nozzle 210/210' may be configured for generating a mixed phase fluid. The mixed phase fluid may comprise a mixture of a liquid and a gas. In an embodiment, the mixed phase fluid may have a gas/liquid volume ratio in the range from about 0.5 (G/L=0.5/1) to 20 (G/L=20/1), or from about one (1) to 20, or from about two (2) to 15. In an embodiment, the mixed phase fluid may comprise liquid hydrocarbons and hydrogen gas. In an embodiment, the gaseous component(s) of the mixed phase fluid may comprise a continuous phase of the mixed phase fluid. In an embodiment, the mixed phase fluid may comprise a froth or liquid foam.

With further reference to FIG. 4, mixed phase distributor system 300 may comprise a particulate layer 310 having a particulate layer upper surface 310a. Mixed phase distributor system 300 may further comprise an upper screen 320 disposed beneath particulate layer 310, and a lower screen 330 disposed beneath upper screen 320. Each of particulate layer 310, upper screen 320, and lower screen 330 may be disposed at least substantially horizontally within reactor shell 30. Mixed phase distributor system 300 may be configured for laterally dispersing the mixed phase fluid within reactor shell 30 during passage of the mixed phase fluid through mixed phase distributor system 300.

Mixed phase distributor system 300 may also be configured for uniformly distributing the mixed phase fluid to a plurality of locations beneath mixed phase distributor system 300. For example, during operation of reactor system 10, the mixed phase fluid may be uniformly distributed by mixed phase distributor system 300 to an upper surface 400a of at least one monolith block 410 comprising monolith stack 400 (see, for example, FIGS. 6A-6B and FIG. 7). Mixed phase distributor system 300 may also be configured for stabilizing the mixed phase fluid for a time period sufficient to distribute the mixed phase fluid from mixed phase distributor system 300 to at least one monolith block 410.

Again with reference to FIG. 4, a first vertical distance, $H_1$, between nozzle tray 200 and upper surface 310a of particulate layer 310 may be generally in the range from about two (2) to 12 inches, or from about two (2) to 10 inches, or from about three (3) to nine (9) inches. In embodiments wherein nozzle distal end 210b may extend below planar portion lower surface 202b of nozzle tray 200, first vertical distance, $H_1$, may be measured from particulate layer upper surface 310a to nozzle distal end 210b. The drawings, including FIG. 4, are not drawn to scale.

Particulate layer 310 may be configured for receiving and laterally dispersing the mixed phase fluid distributed from nozzle tray 200. Particulate layer 310 may comprise particles of various shapes and sizes. As a non-limiting example, particulate layer 310 may comprise spherical particles, irregularly shaped particles, or combinations thereof. In an embodiment, particles comprising particulate layer 310 may have a mean diameter or width generally in the range from about three (3) to 12 mm, or from about four (4) to 10 mm.

Particulate layer 310 may comprise inert particles. Particulate layer 310 may be inert to reactants or other materials fed to reactor system 10, including: the liquid hydrocarbon feed, the gas (e.g., hydrogen), and combinations thereof. In an embodiment, particles comprising particulate layer 310 may comprise a ceramic material. In an embodiment, particulate layer 310 may have a mean depth, $D_1$, generally in the range from about one (1) to 10 inches, or from about one (1) to eight (8) inches, or from about two (2) to five (5) inches.

With still further reference to FIG. 4, upper screen 320 may be configured for restricting vertical passage of the mixed phase fluid therethrough, thereby promoting lateral dispersion of the mixed phase fluid within mixed phase distributor system 300. Upper screen 320 may also be configured for supporting particulate layer 310. A second vertical distance, $H_2$, between upper screen 320 and lower screen 330 may be generally in the range from about zero (0) to six (6) inches, or from about two (2) to five (5) inches. As a non-limiting example, upper screen 320 may comprise a metal plate having a plurality of perforations, e.g., bores, therethrough. In an embodiment, upper screen 320 may have an open area generally in the range from about two (2) to 15%, or from about three (3) to 10%. Upper screen 320 may be configured to cause a pressure drop between its upper and lower surfaces generally in the range from about 0.05 to 0.5 psi, or from about 0.2 to 0.5 psi.

Lower screen 330 may be configured for stabilizing the mixed phase fluid. As a non-limiting example, in embodiments where the mixed phase fluid comprises a liquid foam, lower screen 330 may be configured for maintaining the integrity of the foam. In an embodiment, lower screen 330 may stabilize the mixed phase fluid for a time sufficient to distribute the mixed phase fluid to a plurality of channels 420 of monolith stack 400. Lower screen 330 may also be configured for promoting the lateral distribution of the mixed phase fluid.

In an embodiment, lower screen 330 may have an open area in the range from about one (1) to 50%, or from about two (2) to 30%, or from about two (2) to 20%. Lower screen 330 may be configured to cause a pressure drop between its upper and lower surfaces generally in the range from about 0.05 to 0.5 psi, or from about 0.2 to 0.5 psi. In an embodiment, lower screen 330 may comprise at least one wire mesh. In an embodiment, such wire mesh may have a mesh size generally in the range from about 20 to 100 mesh (U.S. Tyler), or from about 30 to 60 mesh. Such wire mesh may comprise wire having a diameter generally in the range from about 0.1 to 0.5 mm, or from about 0.2 to 0.4 mm. In an embodiment, lower screen 330 may comprise a plurality of lower screen layers (see, for example, FIG. 5).

Again with reference to FIG. 4, mixed phase distributor system 300 may be disposed above an upper surface 400a of monolith stack 400. A third vertical distance, $H_3$, between lower screen 330 and upper surface 400a of monolith stack 400 may be in the range from about zero (0) to four (4) inches, or from about zero (0) to three (3) inches, or from about zero (0) to two (2) inches. Monolith stack 400 may comprise a plurality of monolith blocks 410, wherein each monolith block may comprise a plurality of monolith channels 420 (see, for example, FIGS. 6A-6B and FIG. 7).

Various components of catalytic unit 50 may be supported within reactor shell 30 by one or more support units, structures, or elements (not shown). Such support units and the like may have certain features, elements, and/or characteristics as disclosed in commonly assigned U.S. patent application Ser. No. 12/839,227, filed Jul. 19, 2010, the disclosure of which is incorporated by reference herein in its entirety for all purposes.

Figure 5:
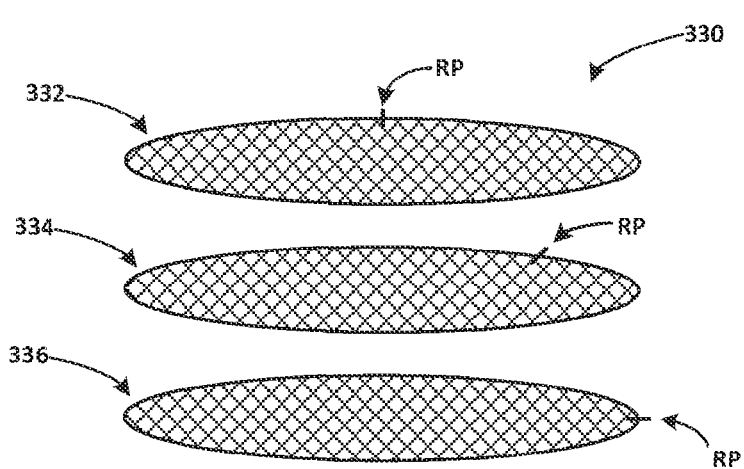
FIG. 5 is a perspective view of a lower screen of a mixed phase distributor system, according to an embodiment of the present invention.

FIG. 5 is a perspective view of a lower screen of a mixed phase distributor system 300, according to an embodiment of the present invention. Lower screen 330 may comprise a plurality of lower screen layers, as represented in FIG. 5 by lower screen layers 332, 334, and 336. Lower screen layers 332, 334, 336 may be similar, dissimilar, or the same. Each of the lower screen layers 332, 334, 336 may have an open area generally in the range from about three (3) to 50%. In an embodiment, one or more layers 332, 334, 336 of lower screen 330 may comprise a wire mesh, for example, substantially as described hereinabove.

In an embodiment, one or more of lower screen layers 332, 334, 336 may be in contact with one or more adjacent layers 332, 334, 336. In another embodiment, one or more of lower screen layers 332, 334, 336 may be separated, e.g., by a gap, from one or more adjacent layers 332, 334, 336. Any gap between one or more adjacent layers 332, 334, 336 may be generally in the range from about zero (0) to two (2) inches. Stated differently, a vertical distance between any one of the lower screen layers 332, 334, 336 and an adjacent one of the lower screen layers 332, 334, 336 may be in the range from zero (0) to about two (2) inches.

In an embodiment, one or more layers 332, 334, 336 of lower screen 330 may be rotationally offset, as shown in FIG. 5 with respect to the reference point, RP. Although the rotational offset shown between adjacent layers 332, 334, 336 in FIG. 5 is about 45°, other rotational offsets may also be used. In another embodiment, at least two of lower screen layers 332, 334, 336 may be aligned with each other, such that there is no offset therebetween. Although FIG. 5 shows three (3) lower screen layers 332, 334, and 336, other numbers of lower screen layers may also be used. The number of lower screen layers in lower screen 330 may be generally in the range from one (1) to about four (4).

Figure 6A:
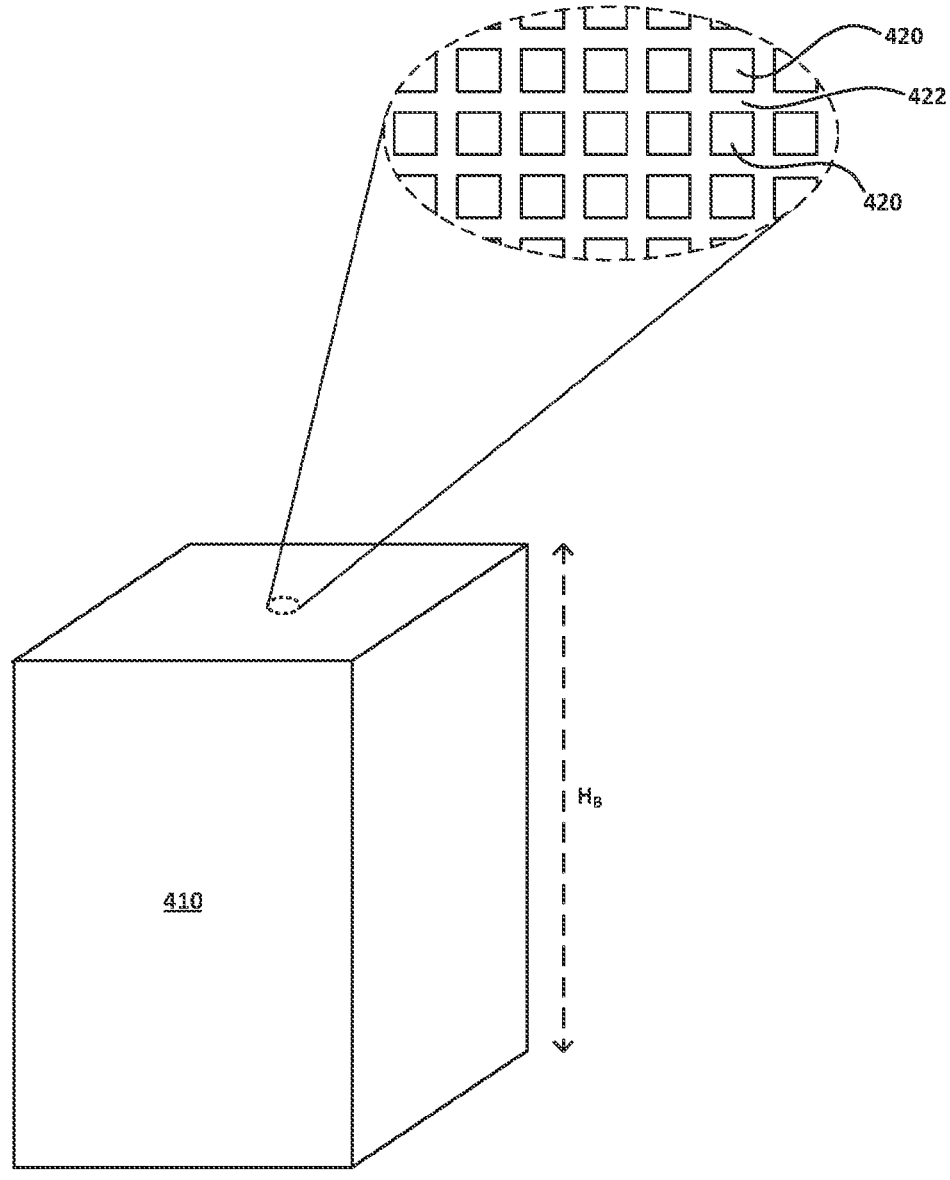
FIG. 6A is a perspective view of a monolith block, including an enlarged portion showing a plurality of bare monolith channels, according to an embodiment of the present invention.

FIG. 6A is a perspective view of a monolith block, according to an embodiment of the present invention. Each monolith block 410 may comprise a single structure. In an embodiment, each monolith block 410 may have a height, $H_B$, in the range generally from about four (4) to 24 inches, or from about six (6) to 18 inches. Monolith block 410 may have various shapes and sizes other than as shown and described with reference to FIG. 6A.

As can be readily seen from the enlarged portion of FIG. 6A, monolith block 410 may include a plurality of channels 420 separated by channel walls 422. Each of the plurality of channels 420 may be arranged at least substantially vertically within monolith block 410. Channels 420 may be arranged at least substantially parallel to each other. Channels 420 may also be referred to herein as "monolith channels."

Although channels 420 are shown as substantially square in cross-section, other cross-sectional shapes for channels 420 may also be used in practicing embodiments of the invention. In an embodiment, the number of channels 420 per unit area of the cross section of monolith block 410, i.e., the cell density, may be generally in the range from about 100 to 1200 channels per square inch (CPSI), or from about 200 to 600 CPSI. Monolith channels 420 that lack a substrate 430 therein, as shown in FIG. 6A, may be referred to herein as bare or uncoated (cf. FIG. 6B).

Figure 6B:
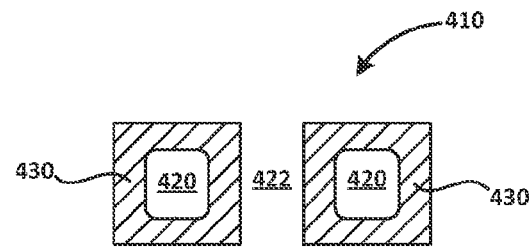
FIG. 6B is a schematic plan view of an adjacent pair of coated monolith channels of a monolith block, according to an embodiment of the present invention.

FIG. 6B is a schematic plan view of a pair of adjacent channels 420 of a monolith block 410, according to an embodiment of the present invention. In FIG. 6B, channels 420 are shown as being coated with a substrate 430. Substrate 430 may be porous. The amount of substrate 430 applied to or coated on channels 420 may be varied. In an embodiment, substrate 430 may comprise a refractory oxide, such as alumina or titania. In another embodiment, monolith block 410 may itself be porous and may comprise a refractory oxide such as alumina or titania.

In an embodiment, a metal may be loaded on substrate 430 to form an active catalyst within monolith channels 420. In an embodiment where monolith block 410 comprises a refractory oxide, a metal may be loaded on monolith block 410 itself. The catalytically active monolith may be used to catalyze various reactions, including those involved in refinery hydroprocessing. In another embodiment, substrate 430 and a suitable metal may be applied simultaneously to monolith block 410. Suitable metal catalysts for loading or applying to monolith block 410 may include, for example, Pt, Pd, and combinations thereof.

Figure 7:
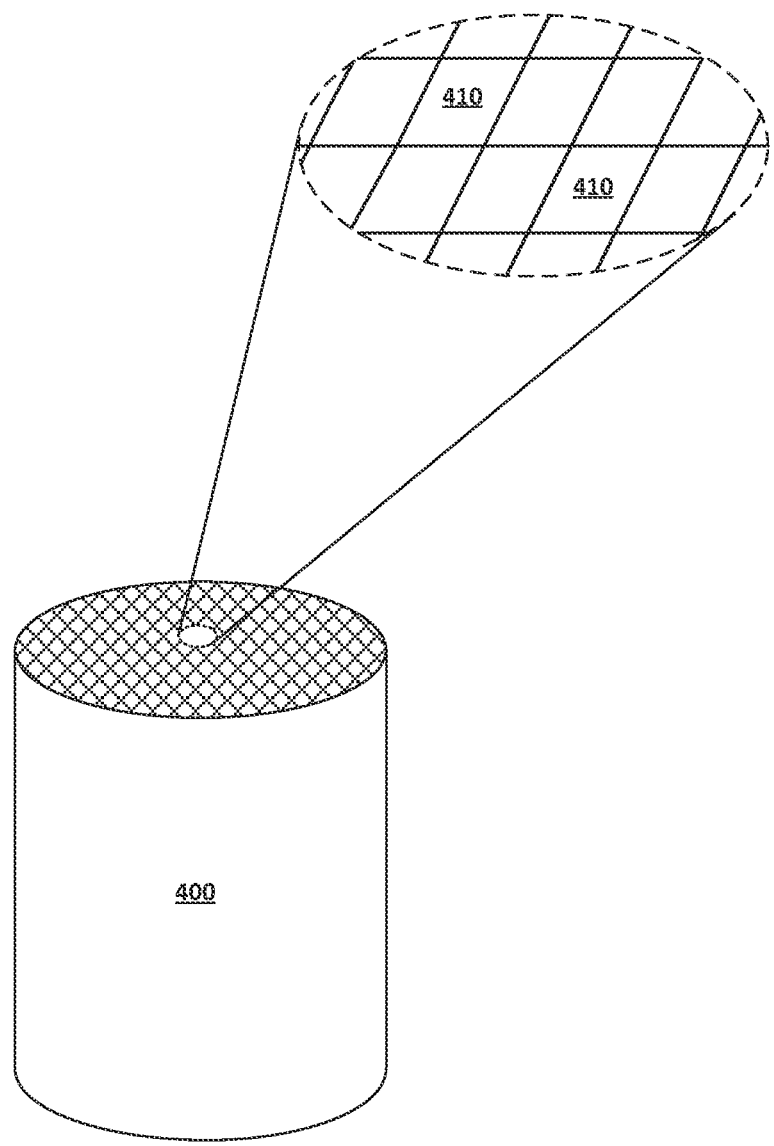
FIG. 7 is a perspective view of a monolith stack, including an enlarged portion showing a plurality of monolith blocks, according to an embodiment of the present invention.

FIG. 7 is a perspective view of a monolith stack, according to an embodiment of the present invention. Monolith stack 400 may comprise a plurality of monolith blocks 410. In an embodiment, monolith stack 400 may be constructed in situ, e.g., within reactor shell 30. During construction of monolith stack 400, each monolith block 410 may be arranged such that all of the channels 420 of monolith stack 400 have substantially the same orientation, e.g., all of the channels 420 of monolith stack 400 may be disposed at least substantially parallel to reactor shell walls 32 (see, for example, FIG. 4).

As a non-limiting example, monolith stack 400 may comprise from about two (2) to 50,000 monolith blocks 410. In an embodiment, certain monolith blocks 410 may be cut or trimmed prior to placement at the periphery of monolith stack 400 so as to fit within reactor shell 30. Any gaps between monolith blocks 410/stack 400 and reactor shell walls 32 may be sealed to prevent fluid leakage therethrough. Monolith stack 400 may have various shapes other than as shown in FIG. 7.

A method for distributing a fluid mixture within a monolithic reactor according to embodiments of the invention may involve contacting a liquid hydrocarbon feed with a gas within each of a plurality of fluid distribution nozzles; and, via the plurality of nozzles, forming a mixed phase fluid comprising the liquid hydrocarbon feed and the gas. Such a method for distributing the fluid mixture within the monolithic reactor may further involve distributing, via the plurality of nozzles, the mixed phase fluid to a mixed phase distributor system; and, via the mixed phase distributor system, distributing the mixed phase fluid to each of a plurality of channels of at least one monolith block.

During the contacting step, the gas may be accelerated into each of nozzles 210/210' to provide a low pressure zone within a void within the nozzle (see, for example, FIGS. 3A-3C). In an embodiment, the gas may be accelerated to a maximum gas velocity generally in the range from about 10 to 100 ft·s$^{-1}$, and typically from about 25 to 60 ft·s$^{-1}$. The liquid hydrocarbon feed may be drawn into the void, e.g., via the low pressure zone. The mixed phase fluid formed by nozzles 210/210' may comprise a homogeneous mixture comprising the liquid hydrocarbon feed and the gas. In an embodiment, the mixed phase fluid may comprise a liquid foam.

The gas may enter distal void 214b from proximal void 214a as a gas stream. The gas stream may flow through at least an axial region 232 of distal void 214b. In an embodiment, the liquid hydrocarbon feed may be delivered to axial region 232 via one or more extension conduits 230 (see, for example, FIGS. 3F-3G). The gas may comprise hydrogen gas.

In an embodiment, the mixed phase fluid may be uniformly distributed to monolith channels 420 as follows. The mixed phase fluid may be contacted with a particulate layer 310, wherein the particulate layer disperses the mixed phase fluid laterally within the particulate layer. After the mixed phase fluid has been laterally dispersed by passage through the particulate layer, the mixed phase fluid may be further contacted by an upper screen 320. The upper screen may restrict the vertical passage of the mixed phase fluid therethrough. As a result of such restriction to vertical flow, the upper screen may further promote lateral distribution of the mixed phase fluid.

After the mixed phase fluid has been laterally dispersed by passage through particulate layer 310 and upper screen 320, the mixed phase fluid may be still further contacted with lower screen 330. The lower screen may serve to still further laterally disperse the mixed phase fluid.

Advantageously, lower screen 330 may also serve to stabilize the mixed phase fluid. By stabilizing the mixed phase fluid, mixed phase distributor system 300 or components thereof may prevent or delay phase separation of the mixed phase fluid and maintain the integrity of the mixed phase fluid. In an embodiment, lower screen 330 may stabilize the mixed phase fluid for a time period sufficient to distribute the mixed phase fluid from mixed phase distributor system 300 to channels 420 of monolith stack 400. As a non-limiting example, in embodiments where the mixed phase fluid comprises a liquid foam, the mixed phase distributor system may stabilize the foam such that channels 420 of monolith stack 400 are contacted by the foam.

The mixed phase fluid may be passed through lower screen 330 in a direction towards the at least one monolith block 410. The laterally dispersed mixed phase fluid emanating from lower screen 330 may be uniformly distributed to at least one monolith block 410, such that each of the plurality of monolith channels 420 therein may be contacted by the mixed phase fluid. During operation of reactor system 10, flow of the mixed phase fluid through monolith stack 400 may be substantially constant with little or no pressure drop fluctuations.

Numerous variations of the present invention may be possible in light of the teachings herein. It is therefore understood that within the scope of the following claims, the invention may be practiced otherwise than as specifically described or exemplified herein.

What is claimed is:

1. A fluid distribution unit, comprising:
a nozzle tray comprising a plurality of nozzles, and
a mixed phase distributor system disposed beneath the nozzle tray, wherein:
each of the nozzles is configured for generating a mixed phase fluid, and wherein each of the nozzles comprises:
a nozzle body,
at least one liquid inlet arranged laterally in the nozzle body, and
an axial gas inlet at the proximal end of the nozzle, wherein:
the nozzle body includes a proximal body portion and a distal body portion, the proximal body portion defines a substantially cylindrical proximal void within the nozzle body, the distal body portion defines a substantially cylindrical distal void within the nozzle body, and the distal body portion comprises an outer cylinder, the proximal void is in fluid communication with the distal void, body, and the proximal body portion comprises the outer cylinder and an inner cylinder disposed within the outer cylinder, with the inner cylinder terminating distally at a location defining the proximal end of the distal void, the distal void is wider than the proximal void, the proximal void and the distal void jointly define an inner surface of the nozzle body, the proximal terminus of the proximal void defines the gas inlet, each of the liquid inlets is in fluid communication with the inner surface of the nozzle body, and the nozzle body comprises an annular nozzle cap sealingly engaged with both the proximal end of the outer cylinder and the proximal end of the inner cylinder, the nozzle tray is configured for distributing the mixed phase fluid to the mixed phase distributor system via the plurality of nozzles, and the mixed phase distributor system is configured for laterally dispersing the mixed phase fluid and for uniformly distributing the mixed phase fluid to a plurality of locations beneath the mixed phase distributor system.

2. The fluid distribution unit according to claim 1, wherein the plurality of nozzles comprise a nozzle array having a triangular pitch with a nozzle spacing in the range from about 3 to 10 inches.

3. The fluid distribution unit according to claim 1, wherein the mixed phase distributor system comprises:
a particulate layer,
an upper screen disposed beneath the particulate layer, and
a lower screen disposed beneath the upper screen.

4. The fluid distribution unit according to claim 3, wherein:
the particulate layer comprises particles selected from the group consisting of spherical particles, irregularly shaped particles, and combinations thereof; and
the particulate layer has a mean depth, $D_1$, in the range from about one (1) to ten (10) inches.

5. The fluid distribution unit according to claim 3, wherein:
the upper screen comprises a metal plate having a plurality of perforations therethrough, and
the lower screen comprises a wire mesh.

6. The fluid distribution unit according to claim 3, wherein:
a first vertical distance, $H_1$, between the nozzle tray and the upper surface of the particulate layer is in the range from about two (2) to ten (10) inches, and
a second vertical distance, $H_2$, between the upper screen and the lower screen is in the range from about zero (0) to six (6) inches.

7. The fluid distribution unit according to claim 3, wherein:
the lower screen comprises a plurality of lower screen layers, and
each of the plurality of lower screen layers has an open area in the range from about 3 to 50%.

8. A reactor system, comprising:
a reactor shell; and
at least one catalytic unit disposed within the reactor shell, wherein each of the catalytic units comprises:
a fluid distribution unit, and
at least one monolith block comprising a monolith stack disposed beneath the fluid distribution unit, wherein the fluid distribution unit comprises:

a nozzle tray comprising a plurality of nozzles, and
a mixed phase distributor system disposed beneath the nozzle tray comprising a particulate layer, an upper screen disposed beneath the particulate layer, and a lower screen disposed beneath the upper screen, wherein:
each of the nozzles is configured for generating a mixed phase fluid,
the nozzle tray is configured for distributing the mixed phase fluid to the mixed phase distributor system, and
the mixed phase distributor system is configured for distributing the mixed phase fluid to each of a plurality of channels of the at least one monolith block and
a vertical distance, $H_3$, between the lower screen and an upper surface of the monolith stack is in the range from about zero (0) to four (4) inches.

9. The reactor system according to claim 8, wherein:
the mixed phase fluid comprises a liquid foam having a gas/liquid volume ratio in the range from about 1.0 to 20,
the foam comprises liquid hydrocarbons and hydrogen gas, and
the mixed phase distributor system is configured for stabilizing the foam for a time period sufficient to distribute the foam to the at least one monolith block.

10. The reactor system according to claim 8, wherein the at least one catalytic unit comprises a plurality of catalytic units stacked vertically within the reactor shell.

11. The reactor system according to claim 8, wherein the at least one monolith block comprises a monolith stack comprising from about two (2) to 50,000 of the monolith blocks.

12. A fluid distribution unit, comprising:
a nozzle tray comprising a plurality of nozzles, and
a mixed phase distributor system disposed beneath the nozzle tray, with the mixed phase distributor system comprising:
a particulate layer,
an upper screen comprising a metal plate having a plurality of perforations therethrough disposed beneath the particulate layer, and
a lower screen comprising a wire mesh disposed beneath the upper screen, and with each of the nozzles configured for generating a mixed phase fluid,
the nozzle tray configured for distributing the mixed phase fluid to the mixed phase distributor system via the plurality of nozzles, and
the mixed phase distributor system configured for laterally dispersing the mixed phase fluid and for uniformly distributing the mixed phase fluid to a plurality of locations beneath the mixed phase distributor system.

13. The fluid distribution unit according to claim 12, wherein the plurality of nozzles comprise a nozzle array having a triangular pitch with a nozzle spacing in the range from about 3 to 10 inches.

14. The fluid distribution unit according to claim 12, wherein:
the particulate layer comprises particles selected from the group consisting of spherical particles, irregularly shaped particles, and combinations thereof; and
the particulate layer has a mean depth, $D_1$, in the range from about one (1) to ten (10) inches.

15. The fluid distribution unit according to claim 12, wherein:
a first vertical distance, $H_1$, between the nozzle tray and the upper surface of the particulate layer is in the range from about two (2) to ten (10) inches, and a second vertical distance, $H_2$, between the upper screen and the lower screen is in the range from about zero (0) to six (6) inches.

16. The fluid distribution unit according to claim 12, wherein:
the lower screen comprises a plurality of lower screen layers, and
each of the plurality of lower screen layers has an open area in the range from about 3 to 50%.

17. A fluid distribution unit, comprising:
a nozzle tray comprising a plurality of nozzles, and
a mixed phase distributor system disposed beneath the nozzle tray with the mixed phase distributor system comprising:
a particulate layer,
an upper screen disposed beneath the particulate layer, and
a lower screen disposed beneath the upper screen, and with
each of the nozzles configured for generating a mixed phase fluid,
the nozzle tray configured for distributing the mixed phase fluid to the mixed phase distributor system via the plurality of nozzles,
the mixed phase distributor system configured for laterally dispersing the mixed phase fluid and for uniformly distributing the mixed phase fluid to a plurality of locations beneath the mixed phase distributor system,
a first vertical distance, $H_1$, between the nozzle tray and the upper surface of the particulate layer is in the range from about two (2) to ten (10) inches, and
a second vertical distance, $H_2$, between the upper screen and the lower screen is in the range from about zero (0) to six (6) inches.

18. The fluid distribution unit according to claim 17, wherein the plurality of nozzles comprise a nozzle array having a triangular pitch with a nozzle spacing in the range from about 3 to 10 inches.

19. The fluid distribution unit according to claim 17, wherein:
the particulate layer comprises particles selected from the group consisting of spherical particles, irregularly shaped particles, and combinations thereof; and
the particulate layer has a mean depth, $D_1$, in the range from about one (1) to ten (10) inches.

20. The fluid distribution unit according to claim 17, wherein:
the upper screen comprises a metal plate having a plurality of perforations therethrough, and
the lower screen comprises a wire mesh.

21. The fluid distribution unit according to claim 17, wherein:
the lower screen comprises a plurality of lower screen layers, and
each of the plurality of lower screen layers has an open area in the range from about 3 to 50%.

22. A fluid distribution unit, comprising:
a nozzle tray comprising a plurality of nozzles, and
a mixed phase distributor system disposed beneath the nozzle tray with the mixed phase distributor system comprising:
a particulate layer,
an upper screen disposed beneath the particulate layer, and
a lower screen comprising a plurality of lower screen layers, disposed beneath the upper screen, with each of the plurality of lower screen layers having an open area in the range of from about 3 to 50%, and with
each of the nozzles configured for generating a mixed phase fluid,
the nozzle tray configured for distributing the mixed phase fluid to the mixed phase distributor system via the plurality of nozzles, and
the mixed phase distributor system configured for laterally dispersing the mixed phase fluid and for uniformly distributing the mixed phase fluid to a plurality of locations beneath the mixed phase distributor system.

23. The fluid distribution unit according to claim 22, wherein the plurality of nozzles comprise a nozzle array having a triangular pitch with a nozzle spacing in the range from about 3 to 10 inches.

24. The fluid distribution unit according to claim 22, wherein:
the particulate layer comprises particles selected from the group consisting of spherical particles, irregularly shaped particles, and combinations thereof; and
the particulate layer has a mean depth, $D_1$, in the range from about one (1) to ten (10) inches.

25. The fluid distribution unit according to claim 22, wherein:
the upper screen comprises a metal plate having a plurality of perforations therethrough, and
the lower screen comprises a wire mesh.

26. The fluid distribution unit according to claim 22, wherein:
a first vertical distance, $H_1$, between the nozzle tray and the upper surface of the particulate layer is in the range from about two (2) to ten (10) inches, and
a second vertical distance, $H_2$, between the upper screen and the lower screen is in the range from about zero (0) to six (6) inches.

* * * * *